(12) United States Patent
Spriegel

(10) Patent No.: US 7,025,878 B2
(45) Date of Patent: *Apr. 11, 2006

(54) FLUID FILTER

(75) Inventor: Clark F. Spriegel, Attica, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/226,604

(22) Filed: Aug. 23, 2002

(65) Prior Publication Data

US 2003/0127385 A1    Jul. 10, 2003

Related U.S. Application Data

(63) Continuation-in-part of application No. 09/797,921, filed on Mar. 2, 2001, now Pat. No. 6,440,303.

(60) Provisional application No. 60/186,467, filed on Mar. 2, 2000.

(51) Int. Cl.
    *B01D 35/02*    (2006.01)

(52) U.S. Cl. ............... 210/232; 210/251; 210/460; 210/497.01; 137/140; 222/189.06

(58) Field of Classification Search ............... 210/232, 210/460, 497.01, 484, 251; 137/140; 222/189.06
See application file for complete search history.

(56) References Cited

U.S. PATENT DOCUMENTS

| 248,886 A | 11/1881 | Saal |
|---|---|---|
| 756,517 A | 4/1904 | Miller |
| 1,230,971 A | 6/1917 | Wilson |
| 1,644,121 A | 10/1927 | Greene |
| 1,788,709 A | 1/1931 | De Spain |
| 3,616,916 A | 11/1971 | Geene |
| 3,738,888 A * | 6/1973 | Johnson ............ 156/238 |
| 3,744,640 A | 7/1973 | Grover |
| 3,783,888 A | 1/1974 | Johnson |
| 3,833,124 A | 9/1974 | Sugiyama et al |
| RE29,405 E | 9/1977 | Gunzel, Jr. et al. |
| 4,118,323 A | 10/1978 | Sugiyama et al. |
| 4,220,285 A | 9/1980 | Gualdi |
| 4,411,788 A | 10/1983 | Kimura |
| 4,603,794 A * | 8/1986 | DeFord et al. ............ 222/207 |
| 5,252,210 A | 10/1993 | Kessel |
| 5,269,338 A | 12/1993 | Figas |
| 5,376,272 A | 12/1994 | Spearman |
| 5,441,637 A | 8/1995 | Gutjahr et al. |

(Continued)

*Primary Examiner*—Robert James Popovics
(74) *Attorney, Agent, or Firm*—Kenneth J. Lukacher; Martin Lukacher

(57) ABSTRACT

A substantially clog-resistant self-supporting fluid filter 100 for attachment to an open end of flow tube 118. Filter 100 comprises a substantially cylindrically shaped grid or fluid intake portion 102 having first end 112 and a second end 116. Fluid intake portion 102 comprises a plurality of substantially parallel longitudinal ribs 106 affixed to a plurality of substantially parallel circular ribs 108 at an angle to longitudinal ribs 106 thereby allowing a fluid to flow therebetween while preventing passage of debris intermixed with the fluid. Longitudinal ribs 106 and circular ribs 108 are substantially rigid such that they cooperate to be structurally self-supporting. End cover 114 is affixed to first end 112.

Filter 100 further comprises tube receiving portion 104, which is affixed to or integral with second end 116 and is configured such that flow tube 118 engages tube receiving portion 104 in a secure, slidable manner.

19 Claims, 10 Drawing Sheets

U.S. PATENT DOCUMENTS

| | | |
|---|---|---|
| 5,534,152 A | 7/1996 | Schick |
| 5,545,318 A | 8/1996 | Richmond |
| 5,567,323 A | 10/1996 | Harrison, Jr. |
| 5,922,197 A | 7/1999 | Sparks |
| 5,966,775 A | 10/1999 | Berfield |
| 6,440,303 B1 * | 8/2002 | Spriegel ............... 210/232 |
| 2001/0023846 A1 * | 9/2001 | Spriegel ............... 210/460 |
| 2003/0127385 A1 * | 7/2003 | Spriegel ............... 210/484 |

* cited by examiner

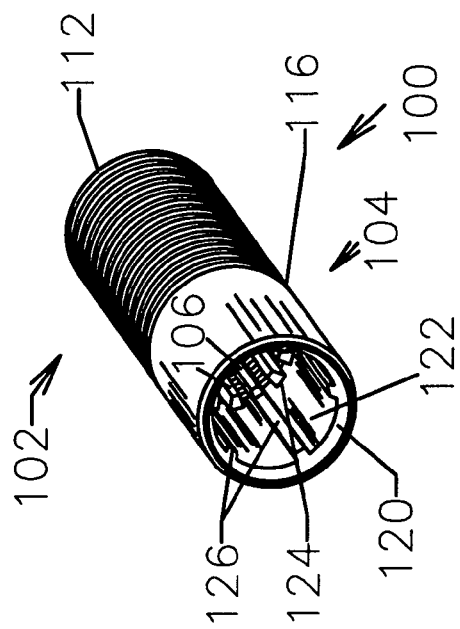
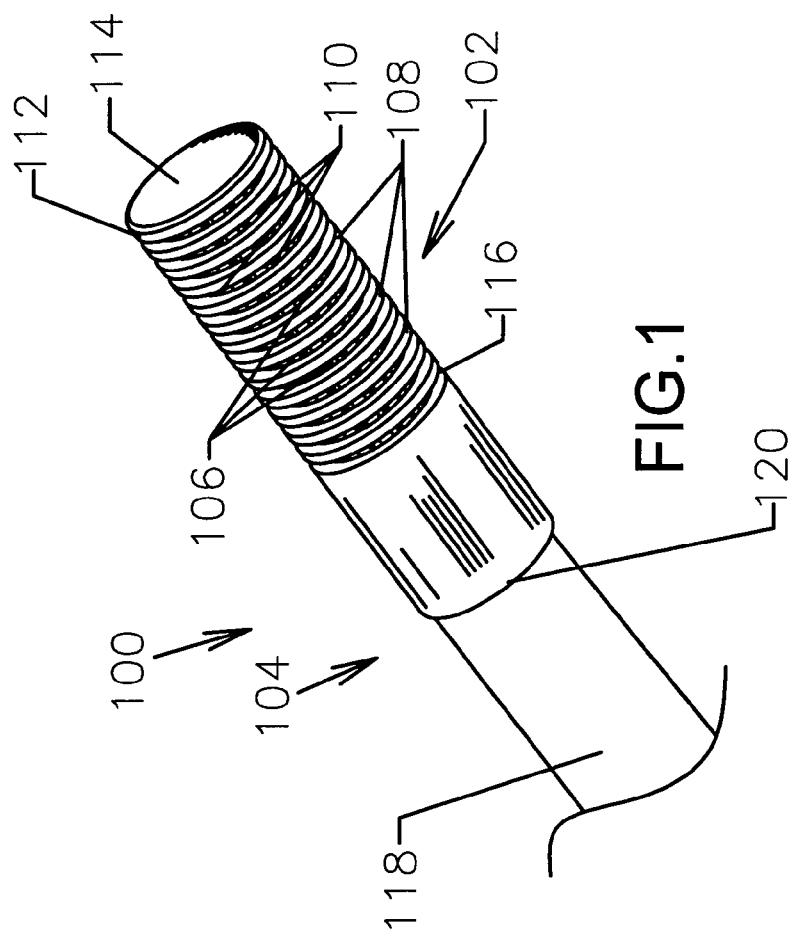

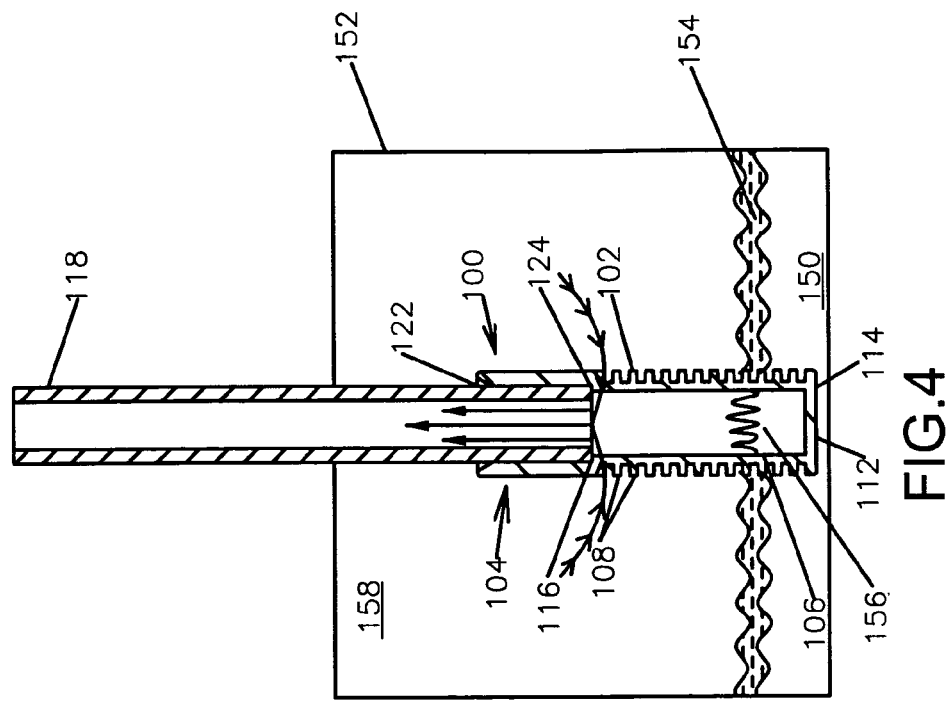
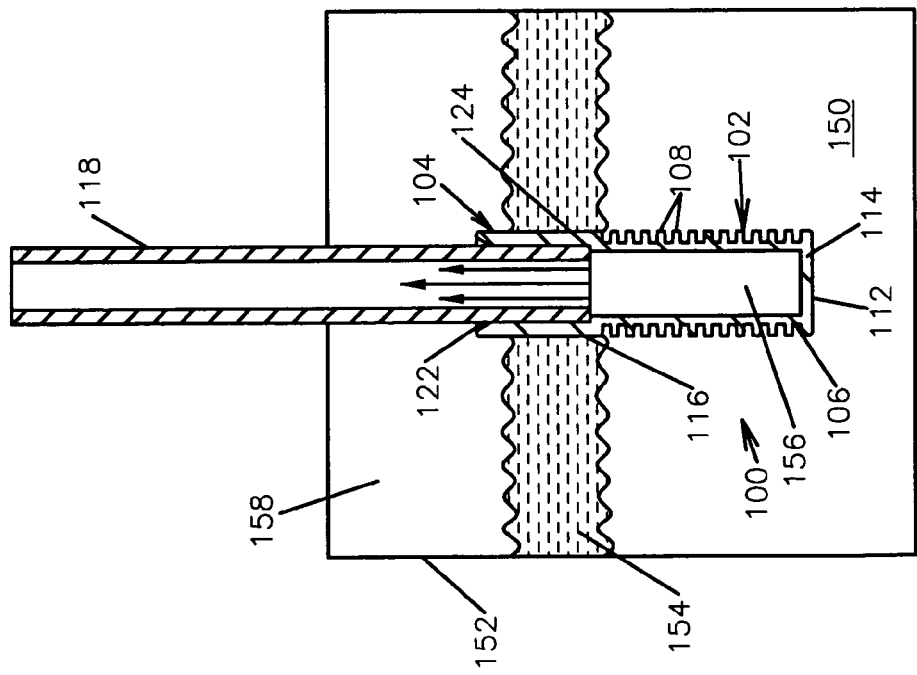

FLUID FILTER

CROSS-REFERENCE TO RELATED APPLICATIONS

This application is a continuation-in-part of U.S. patent application Ser. No. 09/797,921, filed Mar. 2, 2001 now U.S. Pat. No. 6,440,303, entitled Improved Fluid Filter, which claims the benefit of U.S. Provisional Patent Application Ser. No. 60/186,467, filed Mar. 2, 2000.

FIELD OF INVENTION

This invention relates to fluid filters, and more specifically to substantially clog-resistant fluid filters for attachment to the end of a suction pipe, discharge tube and the like, located in a fluid containing tank.

DISCUSSION OF PRIOR ART

As is well known, suction pipes, discharge tubes and the like, useful for drawing fluids from tanks are typically provided at the tip thereof with a fine mesh or net used as a filter adapted to prevent impurities, contaminates or other undesirable or undissolved particulate material from being entrained by the fluid being drawn. Such filters heretofore known in the art are mostly of the type having a net or mesh-like filter stretched along an opening in such conduits. Fine meshes or nets used as filters are highly susceptible to clogging, and are even more susceptible to damage under conditions of extreme pressure combined with jagged debris caught by the filter. This renders these types of filters of little use in applications such as garden sprayers or recreational fuel tanks, where typically varied and voluminous amounts of debris get into the sprayers or tanks, thereby posing a serious threat to the structural integrity of these kinds of filters.

U.S. Pat. No. 4,118,323 to Sugiyama et al., ("Sugiyama '323") discloses a plastic strainer in combination with a suction pipe. The strainer comprises a cylindrical body with a tubular top frame and a non-perforated bottom board that are connected by a plurality of circumferentially spaced support elements. A circular cover that fits the top frame has a center through hole provided with a tubular connector that facilitates insertion of a vacuum pipe into the strainer body. The cover is removably attached to the strainer body by a plurality of nail catches on the top frame that snap into a corresponding plurality of holes in a flange extension of the cover. A fine mesh net is partially embedded in and integrally connected to the top frame, bottom board, and support elements of the strainer body. The maximum depth of penetration of the discharge tube into the strainer frame is determined by an annular bulge on the tube and an annular groove in the top of the filter.

U.S. Pat. No. 3,833,124, also to Sugiyama et al. ("Sugiyama '124"), discloses an immersion type strainer comprising a filter housing having a top plate with an opening therein, a pipe having a bulge portion, and a hollow cylindrical female piece having a recess portion on its inner surface that is complementary to the bulge portion of the pipe. The cylindrical female piece includes a raised portion at one end and an annular collar that cooperate to clamp the female piece to the top plate of the filter housing when the female piece is fitted in the opening of the top plate.

U.S. Pat. No. 4,411,788 to Kimura ("Kimura") discloses a filter for a gasoline tank that comprises a cylindrical filter body having a base and sidewalls, with a net stretched along the periphery thereof, and a lid to cover the open end of the filter body and provided with an insertion hole for a suction pipe. Located on the base of the filter body are a receiving portion and support pieces that engage the tip of the suction pipe. The ribs have support pieces with a surface that establishes the maximum depth of the tube's penetration into the filter.

The filters disclosed in the above references are not self-supporting structures and rely upon a mesh and a separate mesh support structure in order to form the filtering element. Such separation of components necessitates undesirable assembly, and presents the possibility of disassembly or disconnection problems under physical stress to the filter.

Therefore, what is needed in the art is a one-piece, self-supporting, and substantially clog-resistant filter for attachment to the end of a discharge tube.

SUMMARY

The present invention provides a substantially clog-resistant self-supporting fluid filter for attachment to an open end of a flow tube.

The invention comprises, in one form thereof, a substantially cylindrically shaped grid having a first end and a second end. The cylindrically shaped grid comprises a plurality of substantially parallel longitudinal ribs crossed by and integral with or affixed to a plurality of substantially parallel circular ribs at an angle to the longitudinal ribs thereby allowing a fluid to flow therebetween while preventing passage of substantially solid matter and debris intermixed with the fluid. The longitudinal ribs and circular ribs are substantially rigid such that the longitudinal ribs and the circular ribs cooperate to be structurally self-supporting. A substantially circular shaped end cover is integral with or affixed to the first end of the cylindrically shaped grid.

The filter further comprises a tube receiving portion affixed to or integral with the second end of the cylindrically shaped grid. The tube receiving portion has an inner diameter and the open end of the flow tube has an outer diameter. The inner diameter of the tube receiving portion engages the outer diameter of the open end of the flow tube in a secure, slidable manner.

An advantage of the present invention is that the filtering portion is self supporting.

A further advantage of the present invention is that the filter is substantially clog-resistant.

An even further advantage of the present invention is that it is of one-piece design, eliminating the need for assembly of the filter.

DESCRIPTION OF DRAWINGS

The above-mentioned and other features and advantages of this invention, and the manner of attaining them, will become apparent and be better understood by reference to the following description of the embodiments of the invention in conjunction with the accompanying drawings, wherein:

FIG. 1 is an isometric view of one embodiment of a self supporting filter of the present invention;

FIG. 2 is an isometric view of the filter of FIG. 1, showing the interior of the filter;

FIG. 3 is a cross-sectional view of the filter of FIG. 1 operably installed on a discharge tube with the fluid intake portion of the filter fully submerged in debris contaminated water;

FIG. 4 is a cross-sectional view of the filter of FIG. 1 operably installed on a discharge tube with the fluid intake portion of the filter partially submerged in debris contaminated water;

Corresponding reference characters indicate corresponding parts throughout the several views. The exemplifications set out herein illustrate the preferred embodiments of the invention and such exemplifications are not to be construed as limiting the scope of the invention in any manner.

DETAILED DESCRIPTION OF INVENTION

Figure 5:
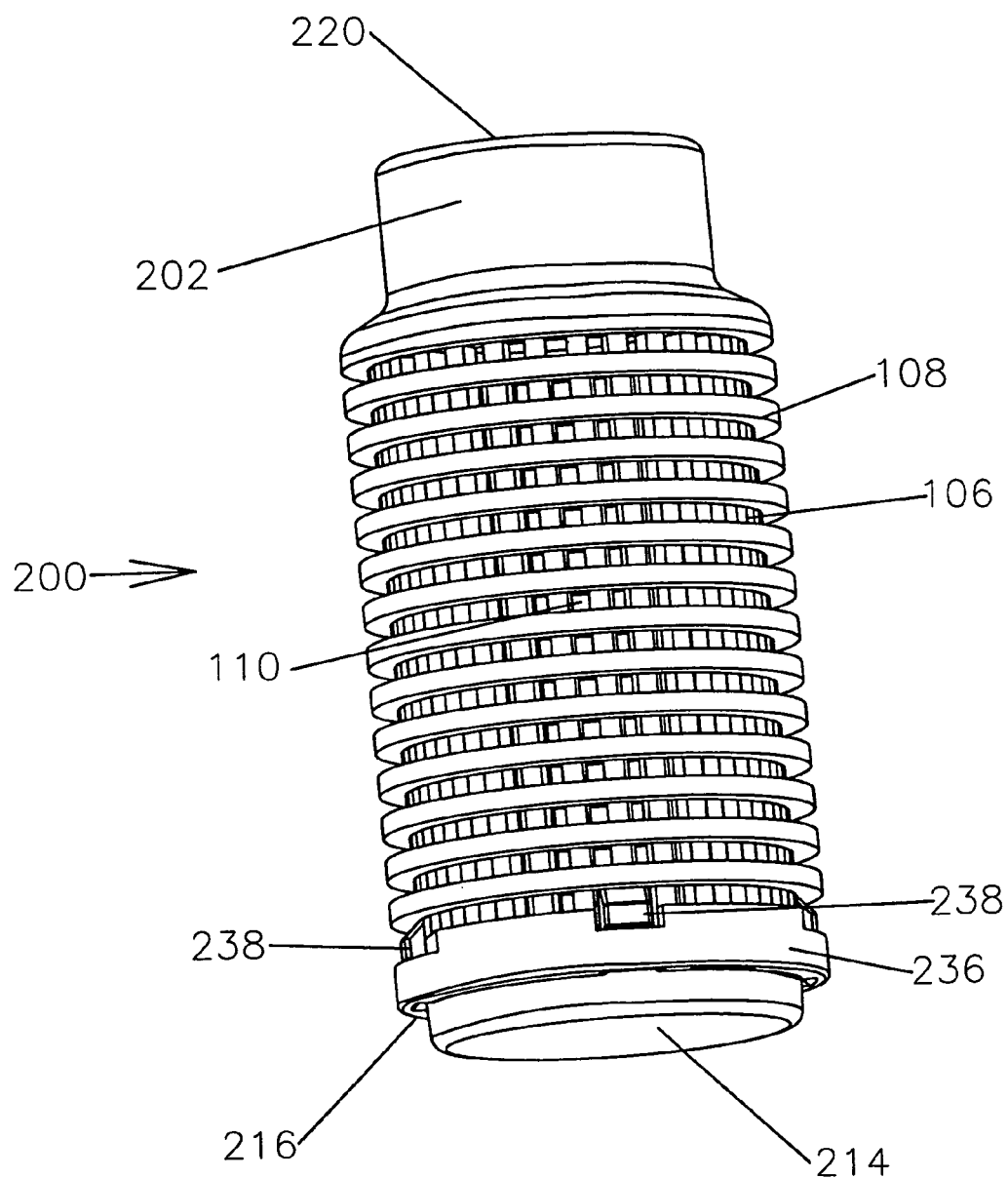
FIG. 5 is an isometric view of a second embodiment of a self supporting filter of the present invention.

Generally, and as will be described more particularly hereinafter, the filter of the present invention is a cylindrical fluid filter that is self-supporting and substantially clog-resistant. Referring to FIG. 1, cylindrical filter 100 includes fluid intake portion 102 and discharge tube receiving portion 104.

Fluid intake portion 102 is preferably constructed with a first plurality of substantially parallel inner longitudinal undulating ribs 106 encircled by second plurality of substantially parallel outer circular ribs 108 thereby forming a grid-like pattern or filtering surface to establish filter apertures 110. The crossed longitudinal ribs 106 and circular ribs 108 provide the structural support for the filter apertures 110 and filter 100 itself. In a preferred embodiment, longitudinal ribs 106 and circular ribs 108 comprise plastic rods and plastic rings, respectively. As shown in FIG. 1, the outer surface of filter 100 formed by ribs 106 and 108 does not taper along the length of fluid intake portion 102. First end 112 of fluid intake portion 102 includes end cover 114. End cover 114 is integral with or affixed to first end 112 of fluid intake portion 102. End cover 114 closes off first end 112 of fluid intake portion 102, thereby protecting the filter structure from damage, penetration and the like. End cover 114 is thin such that filter apertures 110 closest to first end 112 are proximate to the bottom of the fluid container and provide for more complete drainage of the fluid. The prior art does not teach a filter element that performs these functions in combination with a structurally self-supporting filter structure. Second end 116 of fluid intake portion 102 is integral with or affixed to tube receiving portion 104.

Discharge tube 118 fits securely and slidably into tube receiving portion 104 on one end of filter 100. Referring now to FIG. 2, tube receiving portion 104 includes opening 120 and inner surface 122. Discharge tube 118 is slidable within tube receiving portion 104 from opening 120 to ridge 124 formed by longitudinal ribs 106 at second end 116 of fluid intake portion 102. Ridge 124 spaces the end of discharge tube 118 from end cover 114 and prevents the end of discharge tube 118 from becoming blocked and unable allow for the passage of liquids therethrough. Also, ridge 124 precludes discharge tube 118 from substantially penetrating intake portion 102, thus the entire range of filter apertures 110 has substantially uniform access to the open end of discharge tube 118. As shown in FIG. 2, ridge 124 is inwardly offset with respect to the inner diameter of tube receiving portion 104. A plurality of extended longitudinal ribs 126 extend from ridge 124 to opening 120. Extended longitudinal ribs 126 are embossed on inner surface 122 of tube receiving portion 104 to provide a secure fit for discharge tube 118. Thus, a one-piece filter is provided. Therefore, undesirable assembly of the filter is avoided.

In use, fluid flows through apertures 110 of filter 100 into discharge tube 118 while contaminants such as, for example saw dust, grass clippings, and undissolved articles are precluded from entering filter 100. More particularly, suction from discharge tube 118 and/or an increased pressure in the container compels fluid from the container to flow through apertures 110 all along fluid intake portion 102. The grid formed by longitudinal ribs 106 and circular ribs 108 blocks contaminants such as, for example saw dust, grass clippings, and undissolved articles, thereby filtering the fluid.

FIG. 3 depicts the operation of the invention when immersed in debris contaminated fluid 150 in tank 152, wherein debris 154 blocks a fraction of fluid intake portion 102 as shown, thereby preventing the filtering of fluid 150 through filter 100 at these clogged or blocked filter surface regions. However, due to the extensive filter surface area presented at a wide range of depths, filter 100 continues to draw filtered liquid 156 into discharge tube 118 at a substantial rate through the unblocked region of fluid intake portion 102. In this example, fluid intake portion 102 is not exposed to air and/or gas 158 located at the top of tank 152, because fluid intake portion 102 is located below air and/or gas 158.

FIG. 4 depicts the operation of the invention wherein an amount of fluid 150 in tank 152 depicted in FIG. 3 has been removed, and filter 100 is now immersed in debris contaminated fluid 150 to the maximum depth. More particularly, filter 100 is located at the bottom of tank 152. Additionally, the uppermost region of fluid intake portion 102 is now exposed to air and/or other gases 158 present above the surface of debris contaminated fluid 150, the middle segment of fluid intake portion 102 is now blocked by debris 154, and the bottom segment of fluid intake portion 102 remains open to freely filter fluid 150. Although discharge tube 118 may draw some air and/or gases 158 out with filtered liquid 156 because of the region of fluid intake portion 102 exposed to air or other gases 158, the resulting rapid passage of air or gases 158 lowers the pressure within filter 100 (the Bernoulli Principle). As depicted in FIG. 4, the lower pressure within filter 100 causes the level of filtered liquid 156 to rise inside the filter, wherein some or all of filtered liquid 156 is entrained to be discharged with the exiting gases. These same principles and effects apply whether the debris floats on the surface of the fluid as shown, and/or floats suspended at all or various levels in the fluid, and/or settles to the bottom of the tank.

Referring now to FIG. 5, a second embodiment of a fluid filter of the present invention is shown. The same reference numbers are used to indicate component parts associated with filter 200 that are substantially identical in structure and function as those of filter 100, described above. In general, filter 200 includes a removable end cover or snap-on cap with the possibility of interchangeable alternative snap-on caps.

Filter 200 is preferably constructed with a first plurality of substantially parallel inner longitudinal undulating ribs 106 encircled by second plurality of substantially parallel outer circular ribs 108 thereby forming a grid-like pattern or filtering surface to establish filter openings or apertures 110. The crossed longitudinal and circular ribs provide the structural support for apertures 110 and filter 200 itself. In a preferred embodiment, the first and second substantially parallel ribs comprise, respectively, plastic rods and plastic rings.

Discharge tube 118 fits securely and slidably into tube receiving portion 202 attached to one end of filter 200 and having opening 220. Opening 216, at one end of filter 200 opposite opening 220, receives a snap-on cap cover element 214 (FIGS. 6a and 6b) that snaps onto last rung 236 of filter 200.

Figure 6A:
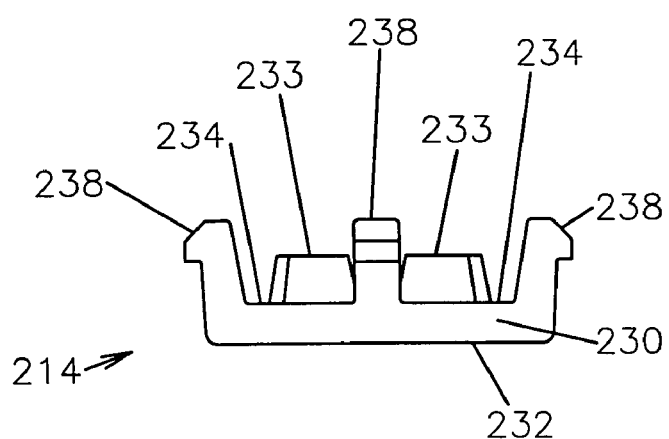
FIG. 6a is a side view of the snap-on cap of FIG. 5.
Figure 6B:
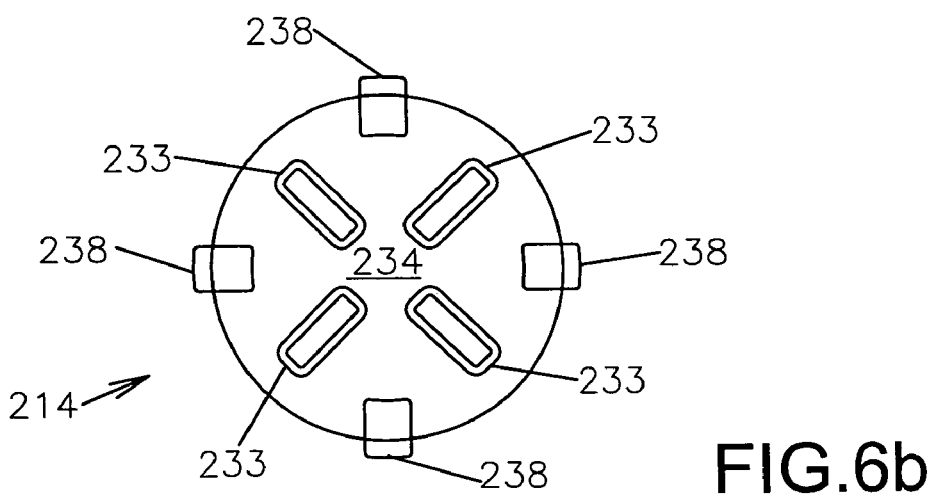
FIG. 6b is a plan view of the snap-on cap of FIG. 5.

As depicted in FIGS. 6a and 6b, snap-on cap 214 has a substantially circular-shaped base 230 having a substantially flat bottom surface 232 and a substantially flat top surface 234. Raised radial spacers or protuberances 233 are located on top surface 234 for engaging the end of discharge tube 118 prior to bottoming out on top surface 234, thereby spacing the end of discharge tube 118 from top surface 234 and preventing the end of tube 118 from becoming blocked and unable to allow for the passage of liquids there through. Snap-on cap 214 snaps onto last filter rung 236 of filter 200 by means of flanges 238, attached to the outer diameter of top surface 234. Each flange 238 has a pawl for engaging openings 240 in filter 200 below last rung 236. Snap-on cap 214 closes off opening 216 located on one end of filter 200, thereby protecting the filter structure from damage, penetration and the like. The basic shape of snap-on cap 214 and the relative height of raised radial spacers 233 from the bottom surface 232 of snap-on cap 214 are depicted in FIGS. 6a and 6b.

For certain applications, the clearance between the height of radial spacers 233 and bottom surface 232 of snap-on cap 214 may leave more liquid inaccessible in the bottom of a fluid filled tank than is desired for a particular application. Alternative embodiments of snap-on cap 214 are depicted in FIGS. 7a, 7b, 8a, and 8b, and provide for more complete drainage of any fluid remaining in the bottom of a fluid filled tank.

Figure 7A:
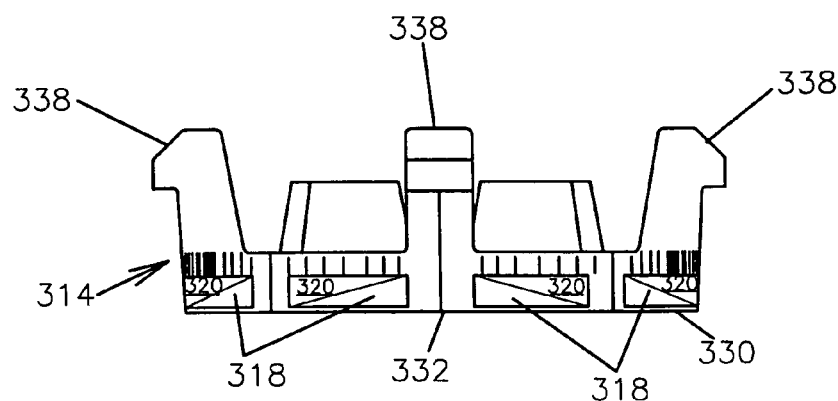
FIG. 7a is a side view of a variation of the snap-on cap of FIG. 5.
Figure 7B:
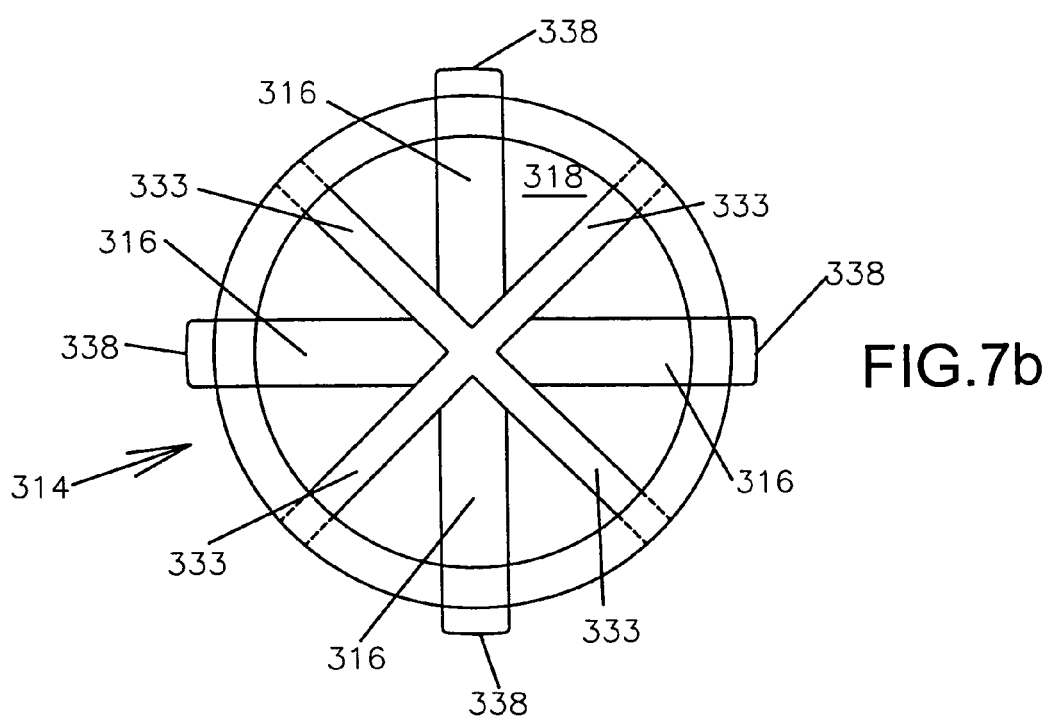
FIG. 7b is a plan view of a variation of the snap-on cap of FIG. 5.

FIGS. 7a and 7b depict an alternative snap-on cap 314 having the same basic shape profile as snap-on cap 214 depicted in FIGS. 6a and 6b. However, in snap-on cap 314, substantially flat inner bottom surface 332 has been modified with reinforced radiating ribs 316 that extend to each flange 338, and graded conical surfaces 318 between each two ribs, reinforcing side openings 320 in base 330 and forming a graded inner cap surface. As depicted in FIGS. 7a and 7b radial spacers 333 extend radially from the center of snap-on cap 314 to its outer diameter in order to strengthen the bottom edge of snap-on cap 314 along base 330 that is thinner when compared to the thickness of base 230 depicted in FIGS. 6a and 6b.

In FIGS. 7a and 7b, the height of radial spacers 333 have been reduced to maintain the same clearance between the graded surface 318 and the bottom of discharge tube 118 as exists between the flat top surface 234 and the bottom of discharge tube 118 shown in FIGS. 6a and 6b. The effect of this is that when discharge tube 118 is perpendicular to the bottom of a fluid filled tank, side openings 320 in base 330 reach closer to the bottom of a fluid filled tank than is possible with snap-on cap 214 depicted in FIGS. 6a and 6b.

As depicted in FIG. 7a, graded surface 318 opens out to all side openings 320 of snap-on cap 314 and diminishes the overall vertical barrier to fluid outside snap-on cap 314. Along with the accompanying reduction in height of radial spacers 333, substantially more fluid can be removed from the bottom of a fluid filled tank when filter 200, attached to a discharge tube or the like, incorporates a snap-on cap having this configuration.

Figure 8A:
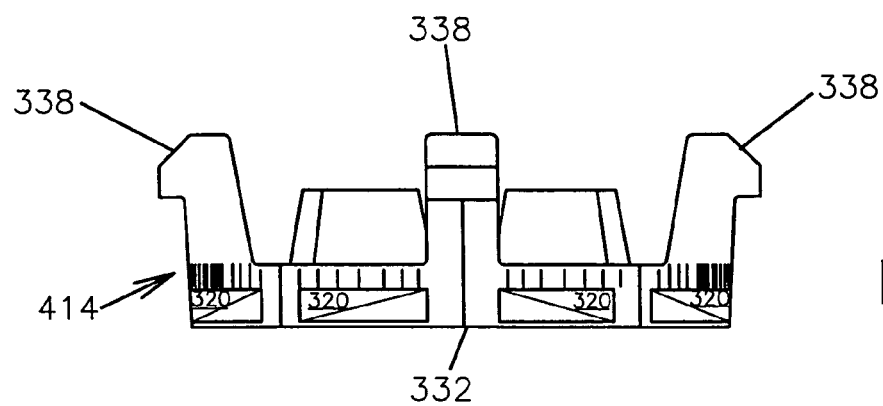
FIG. 8a is a side view of a further variation of the snap-on cap of FIG. 5.
Figure 8B:
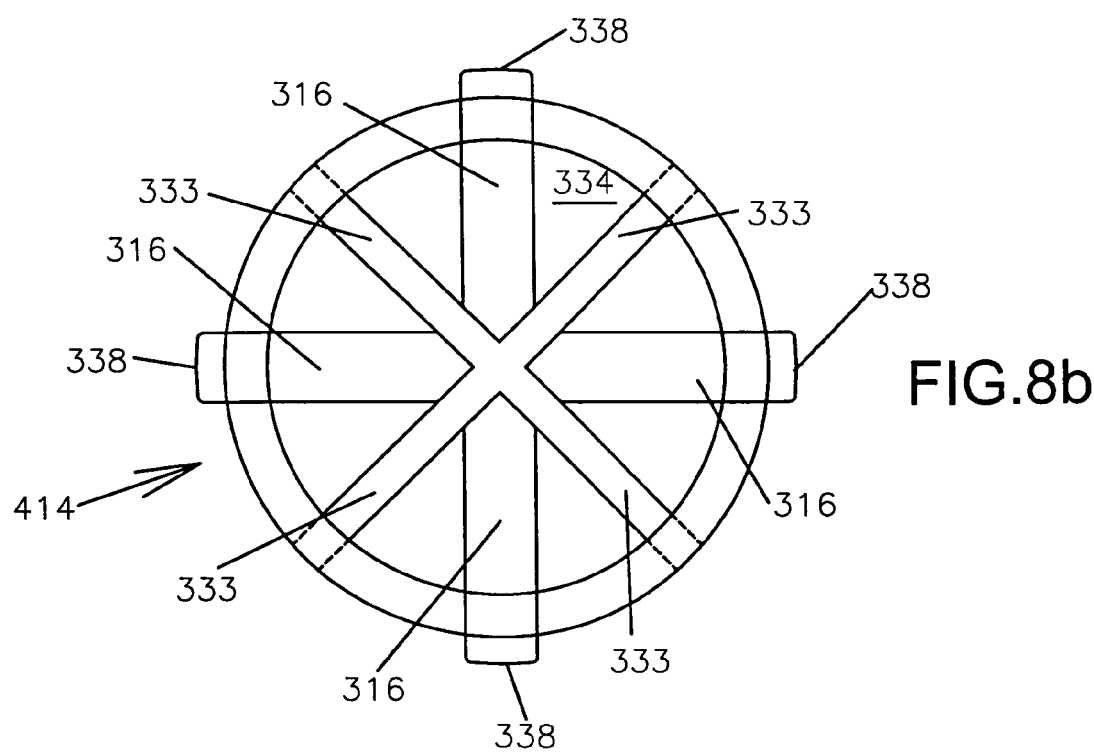
FIG. 8b is a plan view of a further variation of the snap-on cap of FIG. 5.

FIGS. 8a and 8b depict another alternative snap-on cap 414 that is a variation of snap-on cap 314 depicted in FIGS. 7a and 7b. Here, side openings 320 remain open except for the supports for raised radial spacers 333 and flanges 338 that function to reinforce the side openings 320.

Each of the snap-on cap alternatives depicted in FIGS. 7a, 7b, 8a, and 8b promote more complete drainage of fluid remaining in the bottom of the fluid filled tank. Other alternatives for snap-on cap 214 are contemplated that may vary the topology of the inner surface of the snap-on cap to offer additional structural strength, while narrowing still further the gap between the bottom of the discharge tube and the bottom of a fluid filled tank. All embodiments may have dimensions and openings organized on the snap-on cap so as to replicate the function of the filter itself. Reinforced side openings 320 in snap-on cap 314 and snap-on cap 414 depicted herein are merely illustrative. The shapes of side openings 320 should not be limited to the shapes depicted herein, but may have a variety of sizes, shapes and designs, so long as the reinforced side openings 320 are consistent with the filtering requirements for each particular application.

Figure 9:
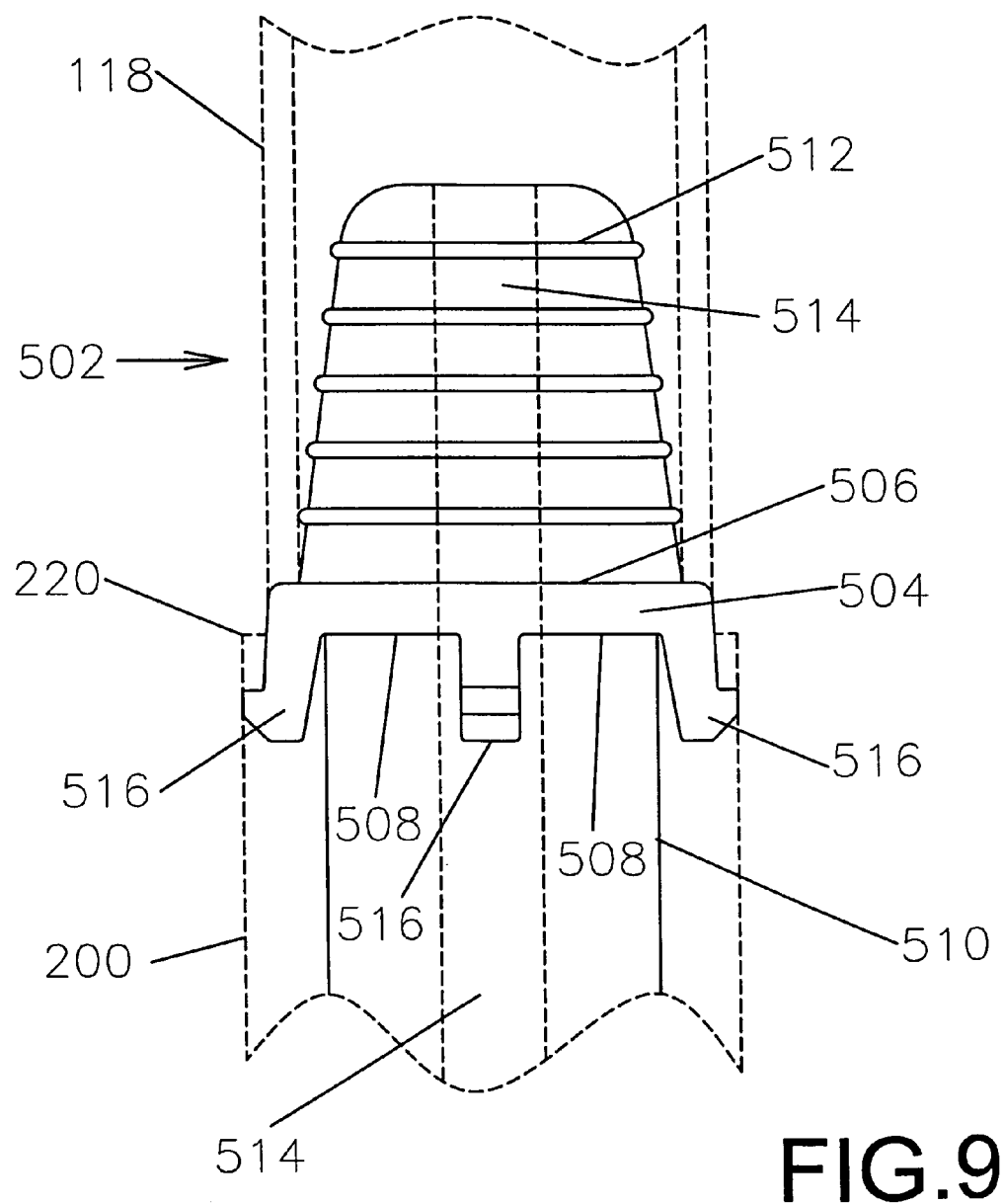
FIG. 9 is a side view of a nipple insert for attachment to the filter of FIG. 5.
Figure 10:
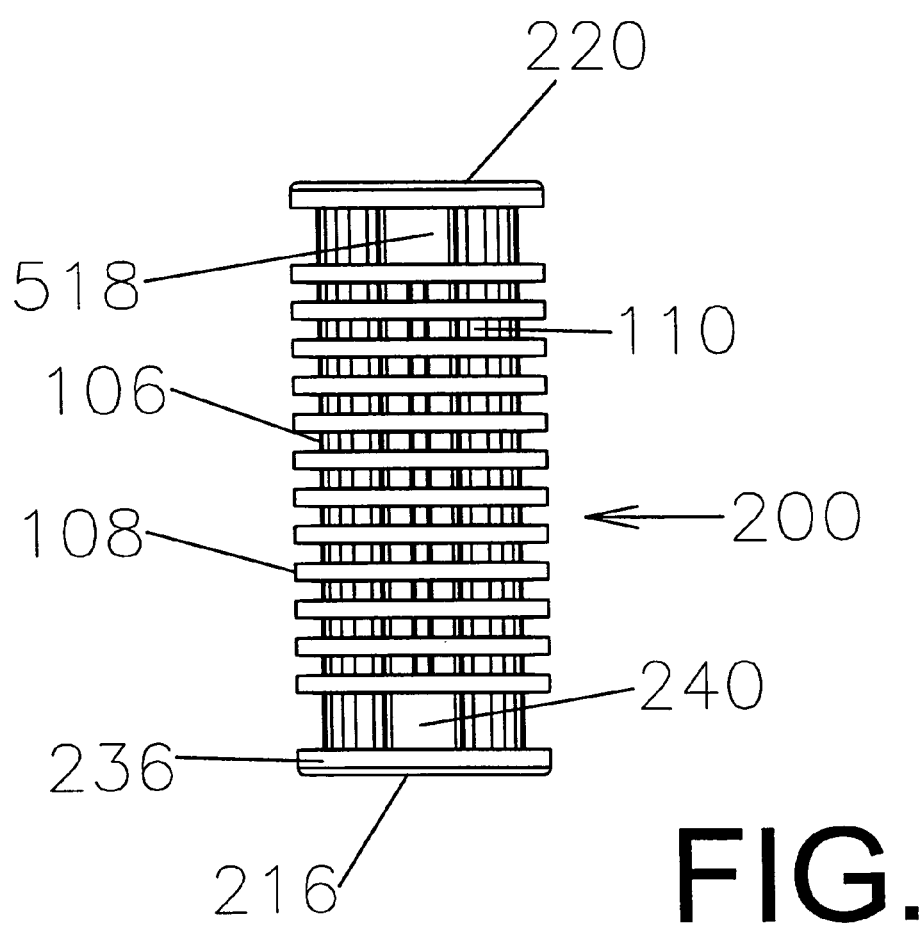
FIG. 10 is a side view of a filter for receiving a nipple insert and a snap-on cap.

Another embodiment of the invention depicted in FIG. 9 features a snap-on nipple insert 502 connecting discharge tube 118 to an alternative embodiment of filter 200 shown in FIG. 10, wherein filter 200 is adapted for receiving both nipple insert 502 and snap-on cap 214, snap-on cap 314, or snap-on cap 414. Nipple insert 502 comprises a base 504 with a top surface 506 and a bottom surface 508, a substantially cylindrical tubular member 510 attached to bottom surface 508 of base 504, a ribbed body 512 having a plurality of ribs located on top surface 506 of base 504, an inner substantially cylindrical tube or conduit 514 running longitudinally along the entire inner axis of insert 502 to permit free flow of fluids through insert 502, and flanges 516 attached to bottom surface 508 of base 504.

Each flange 516 has a pawl for engaging an opening 518, (similar to openings 240 shown in FIG. 5) at open end 220 of filter 200, thereby securely attaching insert 502 to filter 200. Ribbed body 512 of nipple insert 502 sealingly engages the inner wall of discharge tube 118, thereby securely connecting filter 200 to discharge tube 118.

Since discharge tube 118 does not penetrate the body of filter 200 in this embodiment, substantially the entire range of filter apertures or openings 110 (not shown in FIG. 9) will have substantially uniform access to the open end of discharge tube 118. Although tubular member 510 penetrates the body of filter 200, uniform access to substantially the entire range of filter apertures 110 remains because tubular member 510 has a substantially smaller diameter than the inner diameter of filter 200, resulting considerable clearance between tubular member 510 and the inner walls of filter 200.

The invention's potential applications include, but are not limited to, paint and varnish sprayers, garden sprayers, liquid fuel tank feed systems, sumps and the like. One example of the advantages associated with the invention is evident when the filter is used in a garden hand sprayer. Grass and dirt are common filtered elements in a garden hand sprayer. Grass and dirt quickly clog fine mesh filters typically used in conventionally known sprayers. Because the invention does not use a fine mesh, and offers a filter surface area over a wide range depths, as depicted in FIGS. 3 and 4, it is substantially less susceptible to clogging. This same advantage for the invention exists when used with other types of filtering applications.

Figure 11A:
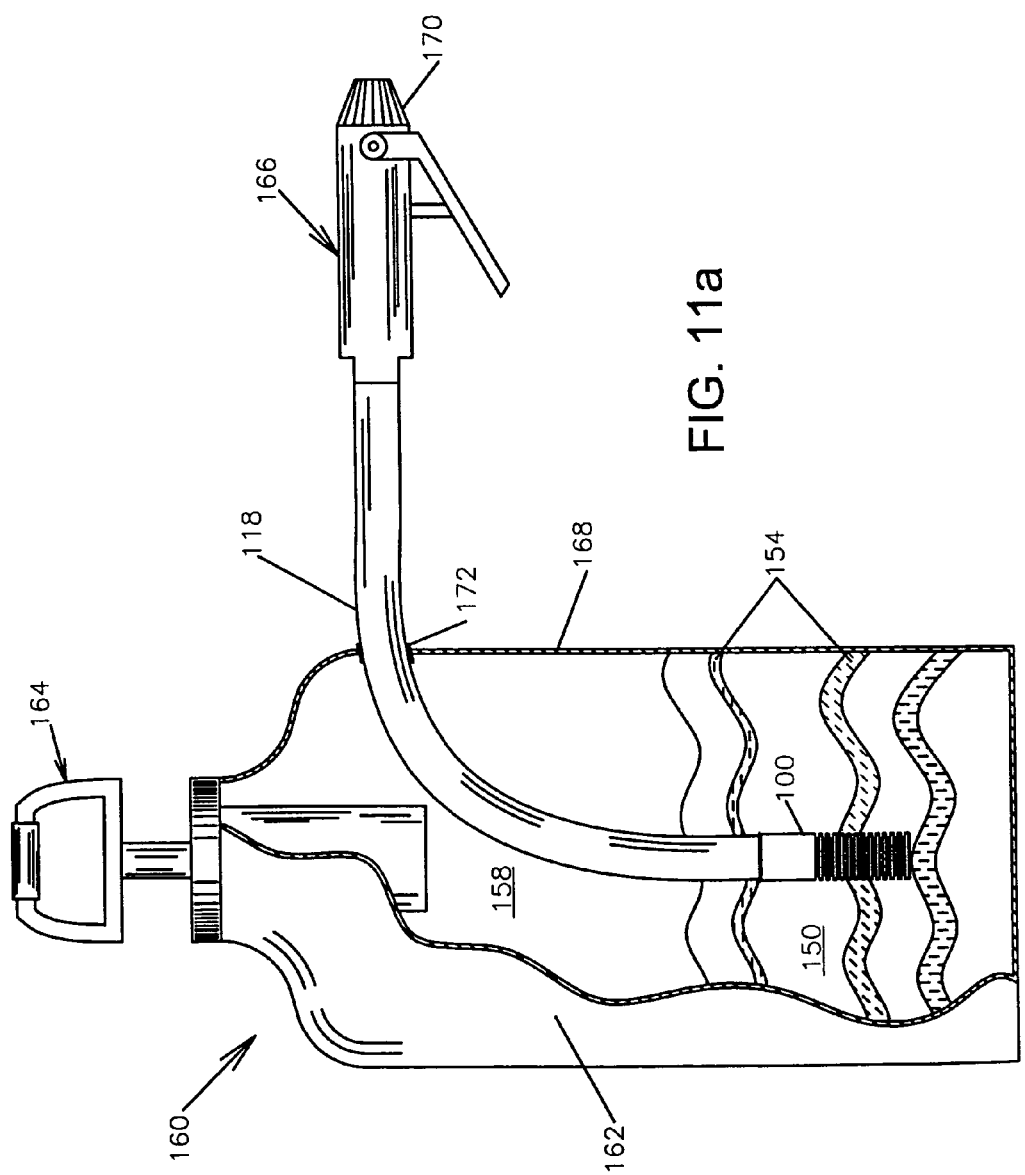
FIG. 11a is an example of the operation of the filter of FIG. 1 operably installed in a garden sprayer.
Figure 11B:
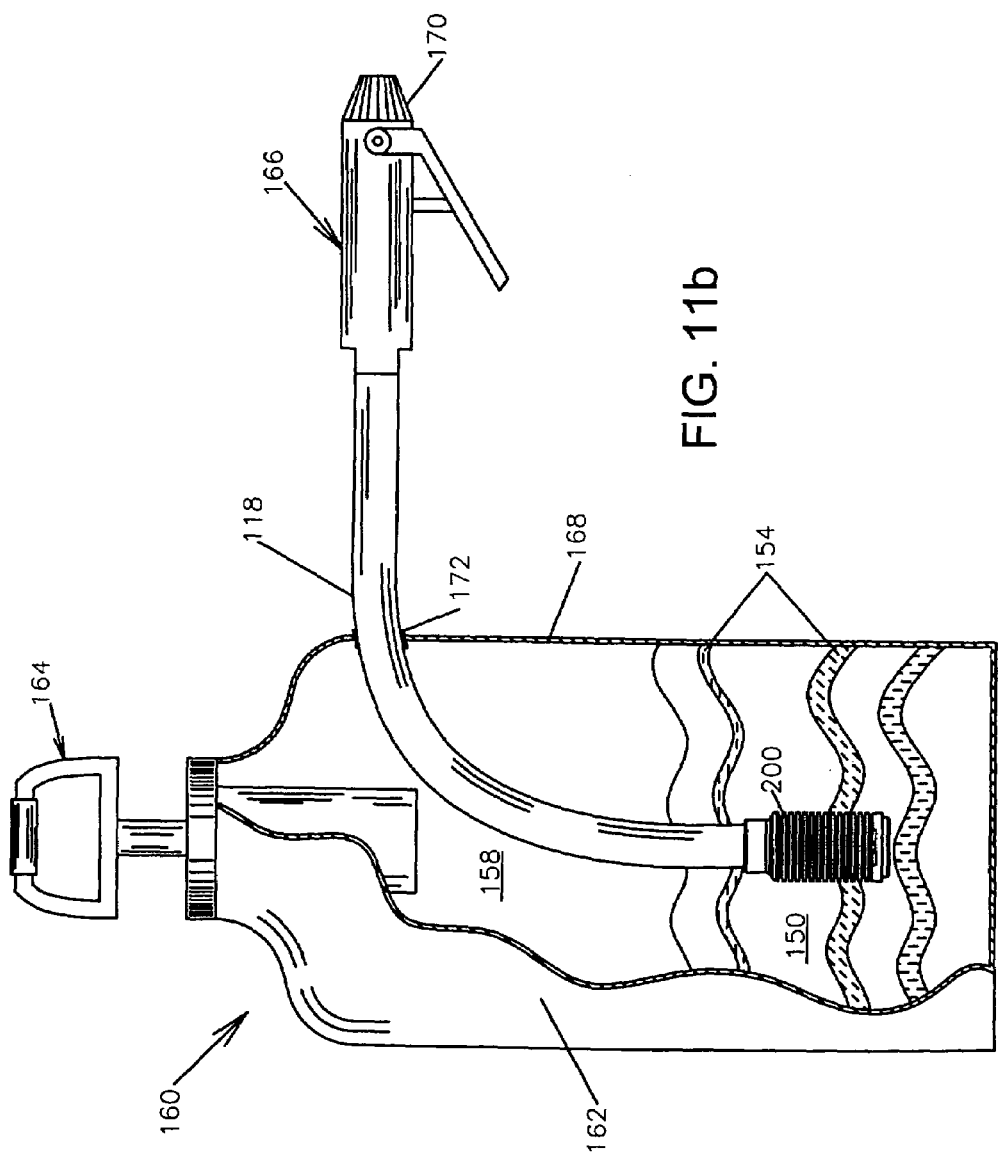
FIG. 11b is an example of the operation of the filter of FIG. 5 operably installed in a garden sprayer.

FIG. 11a shows the operation of filter 100 when used in conjunction with a garden sprayer. Garden sprayer 160 includes vessel 162, hand pump 164, shut-off valve 166, discharge tube 118, and filter 100. Hand pump 164 is mounted on top of vessel 162, which includes wall 168. Shut-off valve 166 is attached to one end of discharge tube 118 and includes nozzle 170. Discharge tube 118 penetrates wall 168 such that wall 168 forms a substantially air tight seal 172 around discharge tube 118. Vessel 162 contains a quantity of fluid 150 that is contaminated with debris such as dirt and grass clippings. Filter 100 attaches to discharge tube 118 as described above. A user operates hand pump 164 to increase the air pressure over fluid 150 and then operates shut-off valve 166 to open shut-off valve 166. The increased air pressure over fluid 150 forces fluid 150 through filter 100, discharge tube 118, opened shut-off valve 166, and out nozzle 170. Filter 100 allows fluid 150 to enter discharge tube 118, however filter 100 prevents substantially solid debris from entering discharge tube 118. FIG. 11b shows the operation of filter 200 operably installed in garden sprayer 160.

The invention was tested to determine its efficacy. The filter was attached to the end of a discharge tube and placed into a compressed air sprayer. The tank was then filled to its capacity level of 1 gallon with water. To test the effectiveness of the filter against a heavily-contaminated load, contaminants comprising about ½ cup of dirt and gravel, about ½ cup of grass clippings, about ½ cup of plastic shavings, and about ½ cup of sawdust were introduced into the water in the tank. In order to demonstrate the capabilities of the invention, this mixture was made atypically diverse and overloaded with contaminants, however, it should be noted that in the normal course of operation, expected contaminants would typically contain fewer ingredients and at a much lower concentration than used in these tests. A pump was affixed to the tank and the tank was pressurized to 40 psi. The shut-off valve was opened, allowing the unit to deliver a spray pattern until the tank was emptied. No pluggage or distortion of the spray pattern occurred. This was repeated 10 times exhibiting approximately the same results.

A second series of tests were performed for comparing the filter to an unfiltered spraying operation. Here, the filter was removed from the discharge tube, and the same tests were conducted again. However, without the filter, each time the valve was opened, it plugged within 4 to 15 seconds, rendering the sprayer useless. Each time the unit plugged, the valve and nozzle had to be dismantled and cleaned.

A third series of tests were performed for comparing the filter to a spraying operation using a conventional filter under the same conditions as above. The conventional filter was located inside the shut-off valve while the tests were conducted. In less than 1 minute, the conventional filter inside the shut-off valve also plugged, rendering the unit useless. Each time the unit plugged and had to be dismantled and cleaned.

When directly immersed in the solution being sprayed, the invention was able to draw liquid through the sediment, straining the liquid and allowing it to flow through the shut-off valve and nozzle orifices without plugging. These tests demonstrate the invention's effectiveness.

It should be particularly noted that by appropriately scaling the desired dimensions of the invention for use in different embodiments, the present invention may be used for larger or smaller filtering applications, from draining large storage tanks to straining fuel for very small engines. The invention itself requires no specific size of filter apertures, filters, discharge tubes, or tanks, except as required for each specific application. Furthermore, the invention requires no specific materials in its construction except as required for each specific application.

It should be further particularly noted that while the invention has been described with reference to preferred embodiments, it will be understood by those skilled in the art that various changes may be made and equivalents may be substituted for elements thereof without departing from the scope of the invention. For example, the two sets of ribs comprising the filter and its supporting structure need not be rectilinearly parallel or perpendicular to the filter's cylindrical axis. In alternative embodiments, both inner and outer sets of ribs may be helically parallel, but at a substantial angle to each other so as to form useful filter apertures. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

What is claimed:

1. A substantially clog-resistant, self-supporting fluid filter for attachment to an open end of a flow tube, said filter comprising:

a substantially cylindrically non-tapered shaped grid having a first end and a second end, said cylindrically shaped grid comprising a first plurality of substantially parallel ribs crossed by and integral with or affixed to a second plurality of substantially parallel ribs at an angle to the first plurality of ribs thereby allowing a fluid to flow therebetween while preventing passage of substantially solid matter and debris intermixed with the fluid;

a substantially circular shaped end cover being integral with or affixed to the first end of said cylindrically shaped grid; and a tube receiving portion having an opening and an inner diameter, said tube receiving portion adapted such that said flow tube can slide through said opening to a ridge formed by one of said first and second plurality of ribs, said ridge being inwardly offset with respect to said interior diameter of said tube receiving portion.

2. The filter according to claim 1, wherein the first plurality of ribs and the second plurality of ribs are substantially rigid such that the first and second plurality of ribs cooperate to be structurally self-supporting.

3. The filter according to claim 1, wherein the first plurality of ribs are substantially longitudinal in direction.

4. The filter according to claim 3, wherein the second plurality of ribs are substantially circular in shape and substantially transverse to the first plurality of ribs.

5. The filter according to claim 1, wherein said tube receiving portion is affixed to or integral with the second end of said cylindrically shaped grid, the open end of said flow tube having an outer diameter, and the inner diameter of said tube receiving portion engaging the outer diameter of the open end of said flow tube in a secure, slidable manner.

6. The filter according to claim 1, wherein said ridge prevents said tube from penetrating past said ridge.

7. A substantially clog-resistant self-supporting fluid filter for attachment to an open end of a flow tube, said filter comprising:
a substantially cylindrically shaped grid having a first end and a second end, said cylindrically shaped grid comprising a plurality of substantially parallel longitudinal ribs crossed by and integral with or affixed to a plurality of substantially parallel circular ribs at an angle to the longitudinal ribs thereby allowing a fluid to flow therebetween while preventing passage of substantially solid matter and debris intermixed with the fluid, the longitudinal ribs and circular ribs being substantially rigid such that the longitudinal ribs and the circular ribs cooperate to be structurally self-supporting;
a substantially circular shaped end cover being integral with or affixed to the first end of said cylindrically shaped grid; and
a tube receiving portion having an opening and an inner diameter, said tube receiving portion adapted such that said flow tube can slide through said opening to a ridge formed by said plurality of substantially parallel longitudinal ribs, said ridge being inwardly offset with respect to said interior diameter of said tube receiving portion.

8. The filter according to claim 7, wherein said tube receiving portion is affixed to or integral with the second end of said cylindrically shaped grid, the open end of said flow tube having an outer diameter, and the inner diameter of said tube receiving portion engaging the outer diameter of the open end of said flow tube in a secure, slidable manner.

9. The filter according to claim 7, wherein said ridge prevents said tube from penetrating past said ridge.

10. A pressurized liquid dispenser apparatus comprising:
a fluid container having a container wall and a quantity of liquid;
a discharge tube having a first tube portion including a first open end and a second tube portion including a second open end, said discharge tube penetrating the container wall of said fluid container such that the first portion is inside said fluid container and the second portion is outside said fluid container;
a shut-off valve engaging the second open end of said discharge tube for controlling a fluid flow from said discharge tube;
means for increasing the air pressure in said fluid container; and
a substantially clog-resistant self-supporting fluid filter for attachment to the first open end of said discharge tube, said fluid filter comprising
a substantially cylindrically shaped grid having a first end and a second end, said cylindrically shaped grid comprising a first plurality of substantially parallel ribs crossed by and integral with or affixed to a second plurality of substantially parallel ribs at an angle to the first plurality of ribs thereby allowing a fluid to flow therebetween while preventing passage of substantially solid matter and debris intermixed with the fluid;
a substantially circular shaped end cover being integral with or affixed to the first end of said cylindrically shaped grid; and
a tube receiving portion having an opening and an inner diameter said tube receiving portion adapted such that said flow tube can slide through said opening to a ridge formed by one of said first and second plurality of ribs, said ridge being inwardly offset with respect to said interior diameter of said tube receiving portion.

11. The apparatus according to claim 10, wherein the first plurality of ribs and the second plurality of ribs are substantially rigid such that the first and second plurality of ribs cooperate to be structurally self supporting.

12. The apparatus according to claim 10, wherein the first plurality of ribs are substantially longitudinal in direction.

13. The apparatus according to claim 12, wherein the second plurality of ribs are substantially circular in shape and substantially transverse to the first plurality of ribs.

14. The apparatus according to claim 10, wherein said tube receiving portion is affixed to or integral with the second end of said cylindrically shaped grid, the first open end of said discharge tube having an outer diameter, and the inner diameter of said tube receiving portion engaging the outer diameter of the first open end of said discharge tube in a secure, slidable manner.

15. The apparatus according to claim 10, wherein said air pressure increasing means is a hand pump mounted on said fluid container.

16. The apparatus according to claim 10, wherein said shut-off valve includes a nozzle.

17. The apparatus according to claim 10, wherein said end cover comprises:
a side opening, a top surface, and a bottom surface; and
at least one flange affixed to or integral with the top surface of said end cover having a pawl for engaging an opening in said filter thereby attaching said end cover to said cylindrically shaped grid.

18. The filter according to claim 10, wherein said ridge prevents said tube from penetrating past said ridge.

19. A substantially clog-resistant, self-supporting fluid filter for attachment to an open end of a flow tube, said filter comprising:
a substantially cylindrically shaped grid having a first end and a second end, said cylindrically shaped grid comprising a first plurality of substantially parallel ribs crossed by and integral with or affixed to a second plurality of substantially parallel ribs at an angle to the first plurality of ribs thereby allowing a fluid to flow therebetween while preventing passage of substantially solid matter and debris intermixed with the fluid;
a substantially circular shaped end cover being integral with or affixed to the first end of said cylindrically shaped grid;
a snap-on nipple insert for attaching said filter to said flow tube, said nipple insert comprising:
a seat having a top surface and a bottom surface;
at least one flange attached to the bottom surface of said seat, said flange having a pawi for engaging an opening of said filter thereby attaching said nipple insert to said filter;
a substantially cylindrical tubular member open at both ends and attached to the bottom surface of said seat for insertion into said filter;
a ribbed body open at both ends and attached to the top surface of said seat for sealingly engaging the inner diameter of the flow tube in order to attach the tube to said filter; and
a substantially cylindrical longitudinal opening along the axis of said nipple insert to permit free flow of liquids and gases through said nipple insert.

* * * * *